United States Patent
Park et al.

(10) Patent No.: US 8,582,689 B2
(45) Date of Patent: Nov. 12, 2013

(54) APPARATUS AND METHOD FOR TRANSMITTING/RECEIVING DATA IN COMMUNICATION SYSTEM

(75) Inventors: Sung-Ik Park, Daejeon (KR); Heung-Mook Kim, Daejeon (KR); Wangrok Oh, Daejeon (KR); Donghoon Kang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 364 days.

(21) Appl. No.: 12/858,102

(22) Filed: Aug. 17, 2010

(65) Prior Publication Data

US 2011/0103515 A1    May 5, 2011

(30) Foreign Application Priority Data

Oct. 30, 2009    (KR) .................. 10-2009-0104693
Jun. 21, 2010    (KR) .................. 10-2010-0058561

(51) Int. Cl.
*H04L 27/04* (2006.01)
*H04L 27/00* (2006.01)

(52) U.S. Cl.
USPC .......................................... 375/301; 455/109

(58) Field of Classification Search
USPC .............. 375/301; 348/723; 455/109, 204, 47
See application file for complete search history.

(56) References Cited

U.S. PATENT DOCUMENTS

| | | | | |
|---|---|---|---|---|
| 7,792,156 | B1 * | 9/2010 | Lee et al. ................. | 370/510 |
| 2005/0117070 | A1 * | 6/2005 | Wu et al. .................. | 348/725 |
| 2007/0300066 | A1 * | 12/2007 | Srinivasan ................ | 713/176 |
| 2009/0279626 | A1 * | 11/2009 | Wang ....................... | 375/260 |
| 2010/0118994 | A1 * | 5/2010 | Park et al. ................ | 375/260 |

FOREIGN PATENT DOCUMENTS

| | | |
|---|---|---|
| KR | 10-2008-0079059 A | 8/2008 |
| KR | 10-2009-0097611 A | 9/2009 |
| WO | WO-2008/105587 A1 | 9/2008 |

OTHER PUBLICATIONS

Cha, JaeSang; Choi, Seung Ho; Kenneth, K. O.; Kim, HeungMook; Kim, SeongKweon; Lee, YongTae; Woo, DeokGun, "An Enhanced Positioning Technique Using MOK-ZCD Watermarking Code Embedded in 8VSB DTV Signal", The 13th World Multi-Conference on Systemics, Cybernetics and Informatics: WMSCI 2009, Jul. 10-13, 2009—Orlando, Florida, USA.*

Xianbin Wang, Yiyan Wu, and Jean-Yves Chouinard, "Robust Data Transmission Using the Transmitter Identification Sequences in ATSC DTV Signals", IEEE, 2005.*

Sung Ik Park, Jae-Young Lee, Heung Mook Kim and Wangrok Oh, "Transmitter Identification Signal Analyzer for Single Frequency Network", IEEE, Sep. 2008.*

Tae Hoon Kwon and Young Woo Suh, "A New Transmitter Identification system for ATSC DTV Standard", Broadcasting Technical Research Institute/KBS, Seoul, Korea, 2008.*

(Continued)

*Primary Examiner* — Aristocratis Fotakis
(74) *Attorney, Agent, or Firm* — Rabin & Berdo, P.C.

(57) ABSTRACT

An apparatus for transmitting data in a communication system includes: a processor configured to process broadcasting data regarding various types of digital broadcasts to be provided to users; an S/P converter configured to convert additional data of the broadcasting data into a parallel type; a phase selector configured to generate a phase selection value using additional data bits, except for a first additional data bit, of the converted parallel-type additional data; a sequence generator configured to generate a sequence using the first additional data bit and the phase selection value; and an adder configured to couple the generated sequence with the processed broadcasting data.

13 Claims, 4 Drawing Sheets

(56) References Cited

OTHER PUBLICATIONS

Young-Woo Suh, Sung Ik Park, Jaekwon Lee, Heung Mook Kim, Jin-Yong Choi, and Jong-Soo Seo, "A New Synchronous Watermark Data Insertion Method for ATSC Transmission Systems", Korea, May 13-15, 2009.*

Donghoon Kang et al.; "Additional Data Transmission Scheme Using TxID Signal for ATSC System", IEEE BMSB 2010; Mar. 2010.

Cha et al., "*An Enhanced Positioning Technique Using MOK-ZCD Watermarking Code Embedded in 8VSB DTV Signal*", 13th *World Multi-Conference on Systemics, Cybernetics and Informatics: WMSCI, Orlando, USA*, Jul. 10-13, 2009.

* cited by examiner

APPARATUS AND METHOD FOR TRANSMITTING/RECEIVING DATA IN COMMUNICATION SYSTEM

CROSS-REFERENCE(S) TO RELATED APPLICATIONS

The present application claims priority of Korean Patent Application Nos. 10-2009-0104693 and 10-2010-0058561, filed on Oct. 30, 2009, and Jun. 21, 2010, respectively, which are incorporated herein by reference in their entirety.

BACKGROUND OF THE INVENTION

1. Field of the Invention

Exemplary embodiments of the present invention relate to a communication system; and, more particularly, to an apparatus and a method for transmitting/receiving additional data of broadcasting data using a Transmitter Identification (TxID) signal in a digital broadcasting system.

2. Description of Related Art

Extensive study has been performed to provide users with services having high transmission rates and various levels of Quality of Service (QoS) in current communication systems. Various approaches have been proposed for fast transmission of various types of video and audio data through limited resources in a digital broadcasting system, which is an exemplary communication system. In other words, there have been a number of proposals to improve the transmission efficiency of broadcasting data, including various types of video and audio data, in a digital broadcasting system. Specifically, in the case of a Double SideBand (DSB) modulation scheme, a number of approaches have been proposed to transmit/receive broadcasting data using a Vestigial SideBand (VSB) modulation scheme in order to improve the transmission efficiency per unit frequency.

In the case of the digital broadcasting system, technologies for transmitting high-quality digital TV signals using a network, which consists of multiple transmitters, have been extensively studied to provide users with various types of high-quality digital broadcasts. Methods for constructing such a network using multiple transmitters include a method using a Multiple Frequency Network (MFN) and a method using a Single Frequency Network (SFN). The SFN is a network constructed between multiple transmitters using a single frequency, and is much more efficient than the MFN in terms of frequency utilization.

Such a digital broadcasting system has a SFN constructed to increase frequency utilization efficiency and to enable reception of digital broadcasts even in mobile and indoor multi-path environments, but has a problem of interference by signals transmitted by adjacent transmitters. In an attempt to avoid this problem, it has been proposed to transmit a TxID signal. Specifically, the TxID signal is transmitted in the digital broadcasting system to enable the receiver to identify transmitters in the SFN, thereby minimizing the above-mentioned interference of signals transmitted between adjacent transmitters. In order to transmit the TxID in the digital broadcasting system, a spreading sequence is generated for each transmitter based on consideration of distributed transmission of broadcasting data, and the spreading sequence for each transmitter is injected into a data symbol of broadcasting data regarding each transmitter according to a watermarking scheme. After the injection, the broadcasting data is transmitted/received. As such, broadcasting data is transmitted/received so as to identify transmitters within the SFN, i.e. together with the TxID signal.

It is to be noted, however, that the current digital broadcasting system schematically discloses transmission/reception of the above-mentioned TxID signal to identify respective transmitters and thus minimize interference of signals transmitted by adjacent transmitters, but no detailed approach has been proposed to transmit/receive broadcasting data, as well as additional data of the broadcasting data, in conformity with user demands for various types of high-quality digital broadcasts, specifically a detailed method for transmitting/receiving the additional data using the TxID signal.

Therefore, there is a need for a method for transmitting/receiving broadcasting data, as well as additional data using a TxID signal in a communication system, e.g. digital broadcasting system, so as to improve frequency utilization efficiency and minimize interference of signals transmitted by adjacent transmitters.

SUMMARY OF THE INVENTION

An embodiment of the present invention is directed to an apparatus and a method for transmitting/receiving data in a communication system.

Another embodiment of the present invention is directed to an apparatus and, a method for transmitting/receiving broadcasting data and additional data of the broadcasting data in a communication system.

Another embodiment of the present invention is directed to an apparatus and a method for transmitting/receiving additional data of broadcasting data using a TxID signal for identifying transmitters within a SFN in a communication system.

Another embodiment of the present invention is directed to an apparatus and a method for transmitting/receiving broadcasting data, as well as additional data using a TxID signal in a communication system, e.g. digital broadcasting system, so as to improve frequency utilization efficiency and minimize interference of signals transmitted by adjacent transmitters.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, an apparatus for transmitting data in a communication system includes: a processor configured to process broadcasting data regarding various types of digital broadcasts to be provided to users; a Serial/Parallel (S/P) converter configured to convert additional data of the broadcasting data into a parallel type; a phase selector configured to generate a phase selection value using additional data bits, except for a first additional data bit, of the converted parallel-type additional data; a sequence generator configured to generate a sequence using the first additional data bit and the phase selection value; and an adder configured to couple the generated sequence with the processed broadcasting data.

In accordance with another embodiment of the present invention, an apparatus for receiving data in a communication system includes: a correlator configured to correlate data received through a transmission frame with a reference Kasami sequence; a processor configured to process broadcasting data from the data received through the transmission frame based on a result of correlation by the correlator; a determiner configured to determine the polarity and code phase of a Kasami sequence from the data received through the transmission frame based on the result of correlation by the correlator; and a restorer configured to restore additional data of the broadcasting data using the determined polarity and code phase of the Kasami sequence.

In accordance with another embodiment of the present invention, a method for transmitting data in a communication system includes: processing broadcasting data regarding various types of digital broadcasts to be provided to users and converting additional data of the broadcasting data into a parallel type; generating a Kasami sequence using the converted parallel-type additional data bits; coupling the processed broadcasting data with the generated Kasami sequence; and modulating the broadcasting data coupled with the Kasami sequence according to a VSB modulation scheme and transmitting the modulated broadcasting data through a transmission frame.

In accordance with another embodiment of the present invention, a method for receiving data in a communication system includes: demodulating data received through a transmission frame according to a VSB demodulation scheme; correlating the demodulated data with a reference Kasami sequence; processing broadcasting data from the data received through the transmission frame in conformity with the correlation; determining the polarity and code phase of a Kasami sequence from the data received through the transmission frame in conformity with the correlation; and restoring additional data of the broadcasting data using the determined polarity and code phase of the Kasami sequence.

DESCRIPTION OF SPECIFIC EMBODIMENTS

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The present invention proposes an apparatus and a method for transmitting/receiving broadcasting data and additional data of the broadcasting data in a communication system, e.g. digital broadcasting system. In accordance with an embodiment of the present invention, additional data of broadcasting data is transmitted/received using a TxID signal for identifying a plurality of transmitters in a network (e.g. SFN) composed of multiple transmitters so that a digital broadcasting system provides users with various types of high-quality digital broadcasts.

Furthermore, in accordance with an embodiment of the present invention, the fact that additional data of broadcasting data is transmitted/received using a TxID signal transmitted to minimize interference of signals transmitted by adjacent transmitters in a network composed of multiple transmitters, e.g. SFN composed of a plurality of transmitters, improves the utilization efficiency of frequencies available in the digital broadcasting network. In addition, minimization of interference between transmitted signals guarantees that a large amount of broadcasting data and additional data of the broadcasting data are smoothly transmitted/received in conformity with user demands for various types of high-quality digital broadcasts. As a result, users are provided with various types of high-quality digital broadcasts.

In accordance with an embodiment of the present invention, broadcasting data and additional data of the broadcasting data are transmitted/received using a VSB modulation scheme to improve transmission efficiency per unit frequency. Those skilled in the art can understand that, although exemplary embodiments of the present invention will hereinafter be described with regard to transmission/reception of broadcasting data and additional data of the broadcasting data according to a VSB modulation scheme, specifically transmission/reception of additional data using a TxID signal, in a digital broadcasting system where multiple transmitters constitute a SFN, the transmission/reception apparatus and method proposed by the present invention are also applicable to other types of communication systems, including a digital broadcasting system where multiple transmitters constitute a MFN, a system where broadcasting data and additional data are transmitted/received according to a modulation scheme other than the VSB modulation scheme. A transmission apparatus in a communication system in accordance with an embodiment of the present invention will now be described in more detail with reference to FIG. 1.

Figure 1:
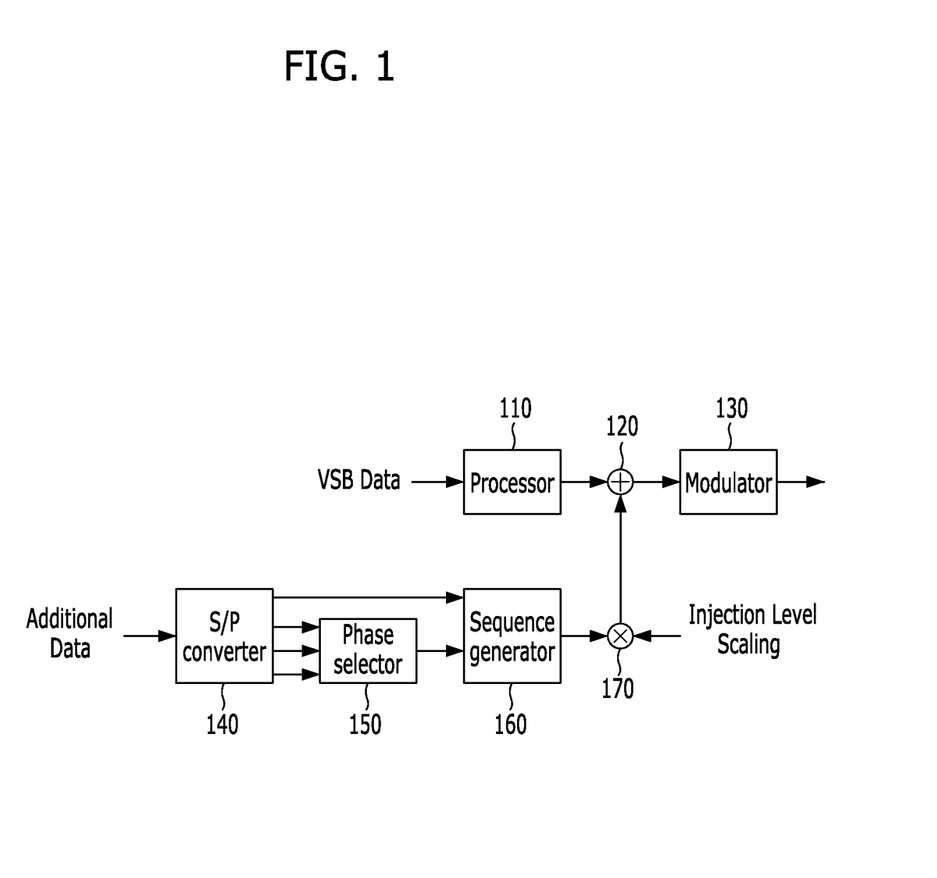
FIG. 1 illustrates a schematic structure of a transmission apparatus in a communication system in accordance with an embodiment of the present invention.

FIG. 1 illustrates a schematic structure of a transmission apparatus in a communication system in accordance with an embodiment of the present invention.

Referring to FIG. 1, the transmission apparatus includes a processor 110 configured to process VSB data, i.e. broadcasting data for providing users with various types of high-quality digital broadcasts; a Serial/Parallel (S/P) converter 140 configured to convert additional data of the broadcasting data from a serial type to a parallel type; a phase selector 150 configured to generate and output a phase selection value using additional data bits, except for the first additional data bit, of the parallel-type additional data converted by the S/P converter 140; a sequence generator 160 configured to generate a sequence using the first additional data bit of the parallel-type additional data converted by the S/P converter 140 and the phase selection value outputted by the phase selector 150; a multiplier 170 configured to multiply the sequence generated by the sequence generator 160 by a predetermined gain value; an adder 120 configured to add data symbols of the broadcasting data processed by the processor 110 and the sequence multiplied by the gain value by the multiplier 170; and a modulator 130 configured to modulate the data added by the adder 120 according to a VSB modulation scheme. The data modulated by the modulator 130, although not shown in detail, goes through an Intermediate Frequency (IF)/Radio Frequency (RF) converter to be converted from an IF-band signal to a RF-band signal, and is transmitted through an antenna.

The processor 110 is configured to receive and process broadcasting data regarding digital broadcasts to be provided to users by a plurality of transmitters existing within the network in conformity with the multiple transmitter network construction, and the broadcasting data processed by the processor 110 is modulated according to a VSB modulation scheme and thus can be referred to as VSB data. The processor 110 is configured to process broadcasting data into a plurality of data symbols in conformity with a transmission frame implemented for the digital broadcasting system to provide digital broadcasts, and the data symbols of the broadcasting data are outputted to the adder 120.

The S/P converter 140 is configured to convert additional data regarding the broadcasting data, which is inputted in a serial type, into parallel-type additional data, and the serial-type additional data is converted into parallel-type additional data as many as ($\log_2 M+1$). Specifically, the S/P converter 140 outputs additional data of ($\log_2 M+1$) bits, and the output rate of the additional data outputted from the S/P converter 140 is $1/(\log_2 M+1)$ in connection with the input rate of additional bits inputted to the S/P converter 140.

The first additional data bit of the additional data of ($\log_2 M+1$) bits outputted from the S/P converter 140, as mentioned above, is used to select the polarity of a sequence generated by the sequence generator 160, and the remaining data bits, e.g. additional data of ($\log_2 M$) bits, are used to select the phase of the sequence generated by the sequence generator 160.

The phase selector 150 is configured to receive additional data bits, except for the first additional data bit, of the additional data of ($\log_2 M+1$) bits outputted from the S/P converter 140, as mentioned above, i.e. receive additional data of ($\log_2 M$) bits. The phase selector 150 is configured to generate and output a phase selection value using the additional data of ($\log_2 M$) bits, enabling selection of the code phase of a sequence (e.g. Kasami sequence) generated by the sequence generator 160.

When additional data of ($\log_2 M$) bits are inputted, the phase selector 150 changes it into a phase selection value, which is used to select one of M code phases of the Kasami sequence generated by the sequence generator 160, and outputs the phase selection value. The number (M) of code phases of the Kasami sequence is determined based on consideration of the length of the maximum channel delay profile of the digital broadcasting system. The complexity of the receiver, which receives broadcasting data and additional data, increases in proportion to the number (M) of code phases of the Kasami sequence. For example, correlation of received signals in the receiver in conformity with the Kasami sequence increases the complexity, but transmission efficiency of the additional data improves.

The sequence generator 160 is configured to generate a Kasami sequence having adjusted polarity and code phase based on the first additional data bit of the additional data of ($\log_2 M+1$) bits outputted from the S/P converter 140 and the phase selection value outputted from the phase selector 150. Specifically, the sequence generator 160 selects the polarity of the Kasami sequence based on the first additional data bit, and selects a code phase from M code phases of the Kasami sequence based on the phase selection value, thereby generating a Kasami sequence with adjusted polarity and code phase. In other words, the sequence generator 160 determines the polarity and code phase of a Kasami sequence using data bits of additional data and, based on the determined polarity and code phase, generates a Kasami sequence with adjusted polarity and code phase. Consequently, the Kasami sequence generated by the sequence generator 160 is a sequence regarding the additional data, and the additional data is converted into a Kasami sequence. Generation of the Kasami sequence by the sequence generator 160 will be described later in more detail with reference to FIG. 2.

The multiplier 170 is configured to multiply a sequence generated by the sequence generator 160 by a gain value and output the sequence multiplied by the gain value to the adder 120. The gain value is an injection level scaling value used to control the injection level when a sequence generated by the sequence generator 160 is injected into data symbols of broadcasting data in the adder 120, e.g. when a Kasami sequence is injected into data symbols of the broadcasting data in a watermarking type.

The adder 120 is configured to add the data symbols of broadcasting data processed by the processor 110 and the sequence multiplied by a gain value by the multiplier 170. As a result of this addition, the sequence generated by the sequence generator 160 is injected into the data symbols of the broadcasting data, so that broadcasting data and additional data are coupled. The coupling of the broadcasting data and additional data will be described later in more detail with reference to FIG. 3.

The modulator 130 is configured to modulate broadcasting data and additional data of the broadcasting data, which have been coupled by the adder 120, according to a VSB modulation scheme. The modulated broadcasting data and additional data are converted from an IF-band signal into a RF-band signal and transmitted through an antenna using a transmission frame, as mentioned above.

As such, the transmission apparatus in accordance with an embodiment of the present invention converts additional data of broadcasting data into a Kasami sequence with adjusted polarity and code phase, injects the Kasami sequence into the broadcasting data, modulates the data according to a VSB modulation scheme, and transmits the data. Due to the fact that the additional data is converted into a Kasami sequence, injected into the broadcasting data, VSB-modulated, and transmitted, the transmission apparatus in accordance with an embodiment of the present invention performs a TxID signal transmission function as a function of identifying transmitters by the Kasami sequence and, at the same time, transmits additional data using a TxID signal transmitted to minimize interference of signals transmitted by adjacent transmitters. Generation of a Kasami sequence in a communication system in accordance with an embodiment of the present invention will now be described in more detail with reference to FIG. 2.

Figure 2:
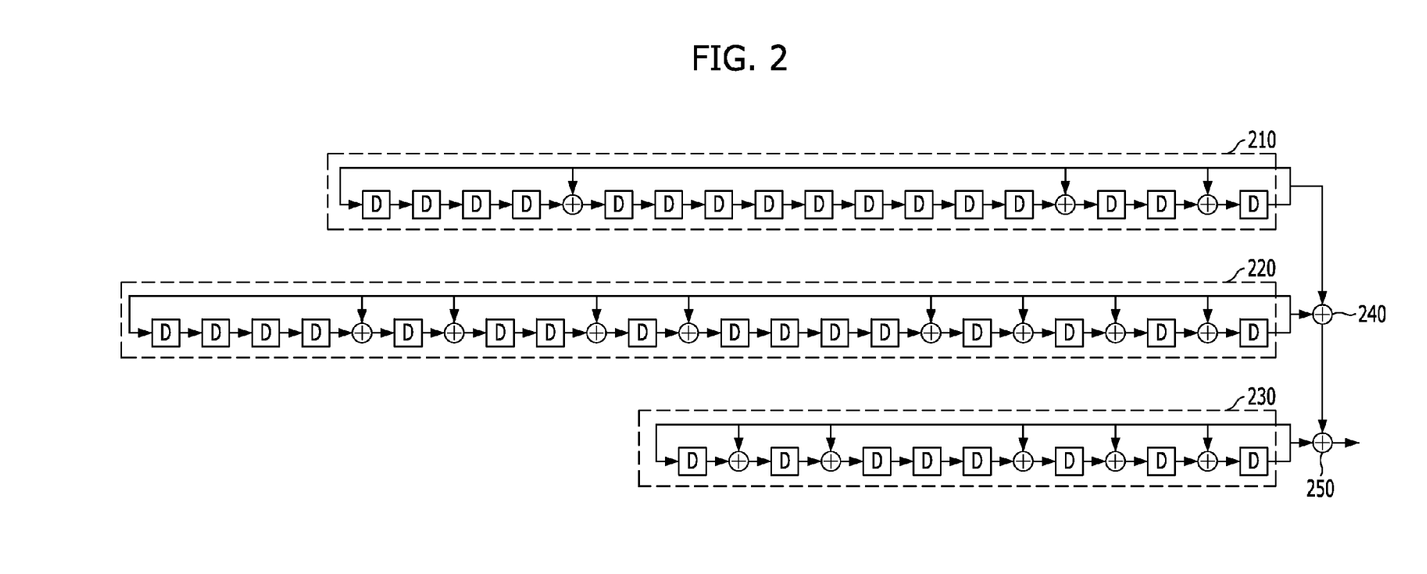
FIG. 2 illustrates a schematic structure of a sequence generator of a transmission apparatus in a communication system in accordance with an embodiment of the present invention.

FIG. 2 illustrates a schematic structure of a sequence generator of a transmission apparatus in a communication system in accordance with an embodiment of the present invention. Specially, FIG. 2 illustrates a schematic structure of the sequence generator configured to generate a Kasami sequence regarding additional data of broadcasting data described with reference to FIG. 1.

Referring to FIG. 2, the sequence generator is configured to generate the above-mentioned Kasami sequence, which consists of binary sequences having a length of $2^n-1$ (n is an even integer). The Kasami sequence has excellent auto-correlation and cross-correlation characteristics. When n=16, for example, the Kasami sequence can be represented as a polynomial defined by Equation 1 below.

$$g(x)=g_1(x) \cdot g_2(x) \cdot g_3(x) \qquad \text{Eq. 1}$$

In Equation 1 above, g(x) refers to a Kasami sequence, $g_1(x)$ refers to a first sequence string, $g_2(x)$ refers to a second sequence string, $g_3(x)$ refers to a third sequence string, and · refers to binary multiplication operation. The first to third sequence strings can be defined by Equation 2 below.

$$g_1(x)=x^{16}+x^{12}+x^3+x+1$$

$$g_2(x)=x^{16}+x^{12}+x^{11}+x^9+x^8+x^4+x^3+x^2+x+1$$

$$g_3(x)=x^8+x^7+x^6+x^3+x^2+x+1 \qquad \text{Eq. 2}$$

According to Equations 1 and 2, the sequence generator includes a first generator 210 configured to generate a first sequence string through a plurality of delay units D and a plurality of adders, a second generator 220 configured to generate a second sequence string through a plurality of delay units D and a plurality of adders, as in the case of the first generator 210, a third generator 230 configured to generate a third sequence string through a plurality of delay units D and a plurality of adders, as in the case of the first and second generators 210 and 220, and adders 240 and 250 configured to add the generated first to third sequence strings and generate a final Kasami sequence. Respective generators 210, 220, and 230 include delay units corresponding to the highest order of respective sequence strings defined by Equation 2 above. The Kasami sequence generated in this manner is, as mentioned above, generated based on additional data (i.e. sequence into which additional data is converted). The Kasami sequence is multiplied by a gain value, injected into the broadcasting data, and transmitted. Coupling of broadcasting data and additional data in a communication system in accordance with an embodiment of the present invention will now be described in more detail with reference to FIG. 3.

Figure 3:
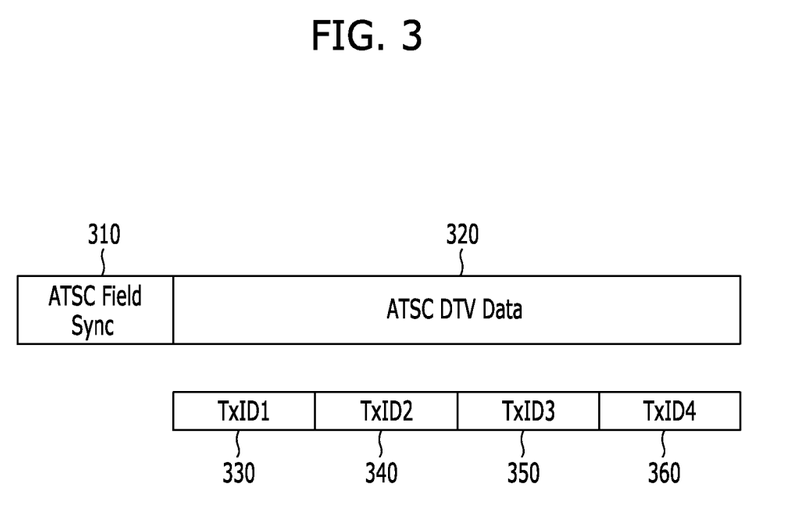
FIG. 3 illustrates a schematic structure of a frame through which broadcasting data and a TxID signal are transmitted in a communication system in accordance with an embodiment of the present invention.

FIG. 3 illustrates a schematic structure of a frame through which broadcasting data and a TxID signal are transmitted in a communication system in accordance with an embodiment of the present invention. Specifically, FIG. 3 illustrates a schematic structure of a transmission frame through which broadcasting data and a TxID signal are transmitted when a digital broadcasting system is to provide users are with digital broadcasts according to a scheme based on Advanced Television Systems Committee (ATSC) standards, for example, in a communication system in accordance with an embodiment of the present invention.

Referring to FIG. 3, the transmission frame includes an area 310 in which a field synchronization signal (ATSC Field Sync) for synchronization is transmitted, an area 320 in which broadcasting data (ATSC DTV Data) modulated according to the VSB modulation scheme is transmitted, and areas 330, 340, 350, and 360 in which TxID signals (TxID1, TxID2, TxID3, TxID4) for identifying respective transmitters are transmitted.

In the transmission frame, for example, 832 data symbols may be transmitted through the area 310 in which the field synchronization signal is transmitted, 259584 data symbols may be transmitted through the area 320 in which broadcasting data is transmitted, and the Kasami sequence in the transmission frame may have a length of 65535. In this case, the length of Kasami sequence transmitting each TxID signal is 64896, and the areas 330, 340, 350, and 360 in which respective TxID signals are transmitted have a Kasami sequence length of 64896. As a result, additional data having a Kasami sequence length of 64896 is transmitted after being injected into the areas 330, 340, 350, 360 in which respective TxID signals are transmitted. As such, the transmission apparatus in accordance with an embodiment of the present invention converts additional data of broadcasting data into a Kasami sequence with adjusted polarity and code phase and transmits the data through the areas 330, 340, 350, and 360 in which respective TxID signals are transmitted, so that the additional data is transmitted using the TxID signal. A reception apparatus in a communication system in accordance with an embodiment of the present invention will now be described in more detail with reference to FIG. 4.

Figure 4:
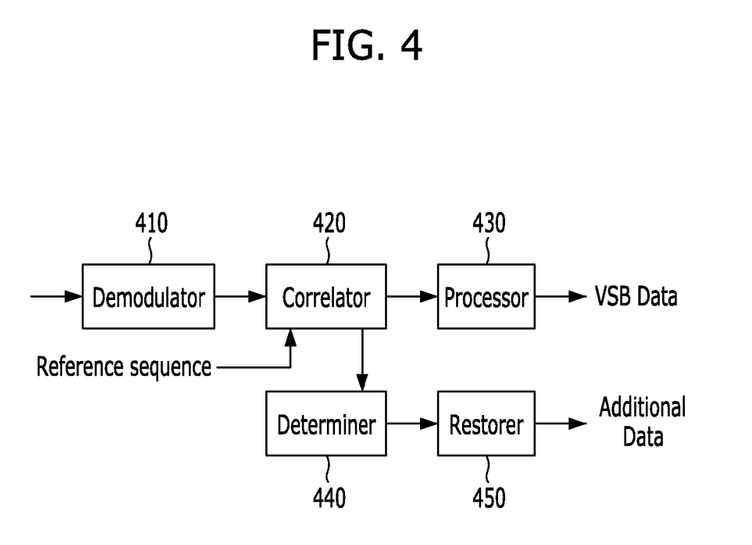
FIG. 4 illustrates a schematic structure of a reception apparatus in a communication system in accordance with an embodiment of the present invention.

FIG. 4 illustrates a schematic structure of a reception apparatus in a communication system in accordance with an embodiment of the present invention.

Referring to FIG. 4, the reception apparatus includes a demodulator 410 configured to receive data through a transmission frame via an antenna and demodulate the data according to a VSB demodulation scheme corresponding to the above-mentioned VSB modulation scheme of the transmission apparatus; a correlator 420 configured to correlate the data demodulated by the demodulator 410 with a reference sequence; a processor 430 configured to process broadcasting data outputted by correlation by the correlator 420 and output original broadcasting data, i.e. VSB data; a determiner 440 configured to determine the polarity and code phase of a sequence outputted by correlation by the correlator 420; and a restorer 450 configured to restore additional data of the broadcasting data from the sequence using the polarity and code phase determined by the determiner 440. The broadcasting data inputted to the demodulator 410 is, after being received via the antenna, goes through a RF/IF converter to be converted from a RF-band signal to an IF-band signal, although not shown in detail, and is then inputted to the demodulator 410.

The demodulator 410 is configured to demodulate received data according to a VSB demodulation scheme corresponding to the VSB modulation scheme, according to which the transmission apparatus modulates and transmits data in the digital broadcasting system, as described with reference to FIG. 2. The correlator 420 is configured to correlate the data demodulated by the demodulator 410 with a reference sequence, i.e. Kasami sequence. The processor 430 is configured to process broadcasting data, which is a result of correlation by the correlator 420, and output original broadcasting data, i.e. VSB data, transmitted by the transmission apparatus of the digital broadcasting system, as described with reference to FIG. 2.

The determiner 440 is configured to determine the polarity and code phase of the Kasami sequence transmitted by the transmission apparatus of the digital broadcasting system, as described with reference to FIG. 2, i.e. Kasami sequence received via the antenna, based on the result of correlation by the correlator 420. The restorer 450 is configured to restore additional data of broadcasting data from the Kasami sequence, which has been transmitted by the transmission apparatus, i.e. restore additional data transmitted by the transmission apparatus, using the polarity and code phase determined by the determiner 440 and output the restored additional data.

As such, the reception apparatus in a digital broadcasting system in accordance with an embodiment of the present invention restores and receives additional data transmitted through a transmission frame using a TxID signal. The reception apparatus performs a TxID signal reception function as a function of identifying transmitters by the Kasami sequence and, at the same time, receives additional data using a TxID signal transmitted to minimize interference of signals transmitted by adjacent transmitters. Operations for transmitting additional data using a TxID signal in a communication system in accordance with an embodiment of the present invention will now be described in more detail with reference to FIG. 5.

Figure 5:
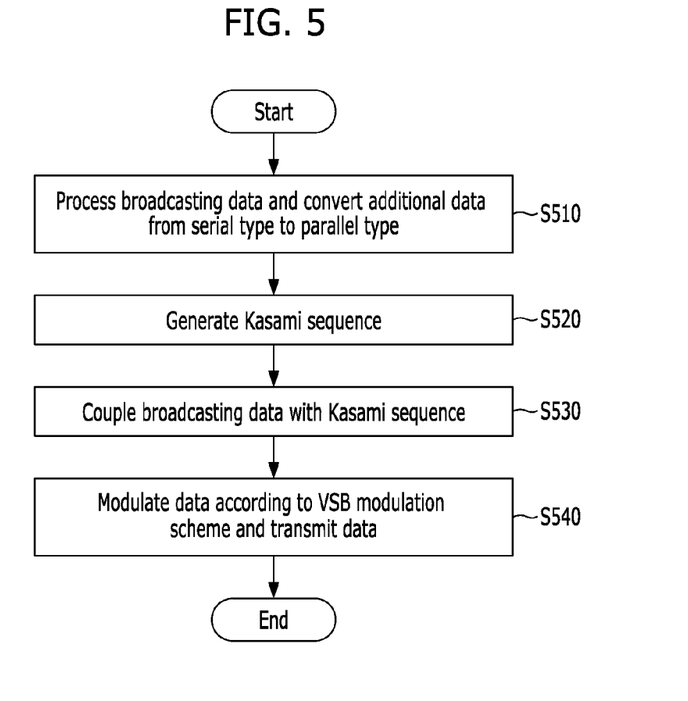
FIG. 5 illustrates a schematic operating process of a transmission apparatus in a communication system in accordance with an embodiment of the present invention.

FIG. 5 illustrates a schematic operating process of a transmission apparatus in a communication system in accordance with an embodiment of the present invention.

Referring to FIG. 5, the transmission apparatus generates and processes broadcasting data corresponding to digital broadcasts to be provided to users, and converts additional data of the broadcasting data from a serial type to a parallel type at step S510. The converted parallel-type additional data has ($\log_2 M+1$) bits.

The transmission apparatus changes additional data bits, except for the first data bit, of the additional data of ($\log_2 M+1$) bits, i.e. changes additional data of ($\log_2 M$) bits into a phase selection value for selecting the code phase of a Kasami sequence, and generates a Kasami sequence having adjusted polarity and code phase based on the phase selection value and the first bit of the additional data of ($\log_2 M+1$) bits at step S520. The generated Kasami sequence performs the function of a TxID signal for identifying a plurality of transmitters existing within the network in conformity with the multiple transmitter network construction and, since it is generated based on additional data, becomes converted additional data.

The transmission apparatus injects the Kasami sequence into broadcasting data to couple the broadcasting data with the Kasami sequence, i.e. couple the broadcasting data with additional data of the broadcasting data at step S530. The transmission apparatus modulates the broadcasting data and the additional data of the broadcasting data according to a VSB modulation scheme and transmits the modulated data through a transmission frame at step S540. The additional data is transmitted through a TxID signal transmission area of the transmission frame, as described with reference to FIG. 3, so that the transmission apparatus transmits the additional data using a TxID signal. Operations for receiving additional data using a TxID signal in a communication system in accordance with an embodiment of the present invention will now be described in more detail with reference to FIG. 6.

Figure 6:
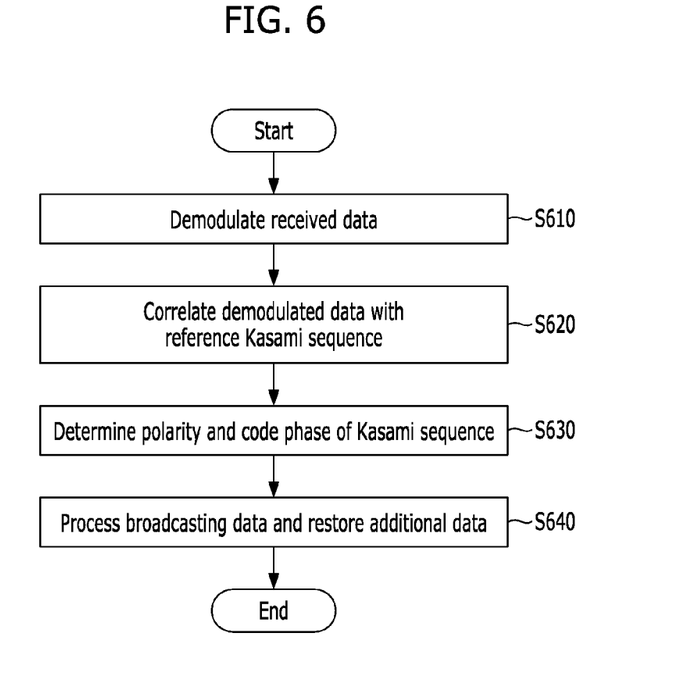
FIG. 6 illustrates a schematic operating process of a reception apparatus in a communication system in accordance with an embodiment of the present invention.

FIG. 6 illustrates a schematic operating process of a reception apparatus in a communication system in accordance with an embodiment of the present invention.

Referring to FIG. 6, the reception apparatus receives data transmitted through a transmission frame, as described with reference to FIG. 3, and demodulates the received data according to a VSB demodulation scheme corresponding to the VSB modulation scheme employed by the transmission apparatus at step S610. The reception apparatus correlates a reference Kasami sequence with the demodulated data at step S620. The reception apparatus determines the polarity and code phase of the Kasami sequence based on the result value of the correlation at step S630.

The reception apparatus processes broadcasting data corresponding to the correlation to restore original broadcasting data transmitted by the transmission apparatus, and restores additional data of the restored original broadcasting data from the Kasami sequence using the determined polarity and code phase of the Kasami sequence at step S640. The reception apparatus receives additional data transmitted using a TxID signal through correlation between the signal received from the transmission apparatus and the reference Kasami sequence and, based on the TxID signal by which the additional data is received, identifies a plurality of transmitters existing within the network in conformity with the multiple transmitter network construction.

In accordance with the exemplary embodiments of the present invention, additional data of broadcasting data is transmitted/received using a TxID signal for identifying a plurality of transmitters existing within a network in a communication system, thereby improving frequency utilization efficiency and minimize interference of signals transmitted by adjacent transmitters. Furthermore, a large amount of broadcasting data, as well as additional data of the broadcasting data, can be transmitted/received efficiently in conformity with user demands for various types of high-quality digital broadcasts. Consequently, users are provided with various types of high-quality digital broadcasts.

While the present invention has been described with respect to the specific embodiments, it will be apparent to those skilled in the art that various changes and modifications may be made without departing from the spirit and scope of the invention as defined in the following claims.

What is claimed is:

1. An apparatus for transmitting data in a communication system, comprising:
 a processor configured to process broadcasting data regarding various types of digital broadcasts to be provided to users;
 a Serial/Parallel (S/P) converter configured to convert additional data of the broadcasting data into a parallel type;
 a phase selector configured to generate a phase selection value using additional data bits, except for a first additional data bit, of the converted parallel-type additional data;
 a sequence generator configured to generate a sequence using the first additional data bit and the phase selection value; and
 an adder configured to couple the generated sequence with the processed broadcasting data.

2. The apparatus of claim 1, wherein the sequence is a Kasami sequence.

3. The apparatus of claim 2, wherein the sequence generator is configured to select polarity of the Kasami sequence using the first additional data bit and select a code phase from code phases of the Kasami sequence using the phase selection value.

4. The apparatus of claim 3, wherein the sequence generator is configured to generate the Kasami sequence having adjusted polarity and an adjusted code phase in conformity with the selected polarity and the selected code phase.

5. The apparatus of claim 3, wherein the Kasami sequence has a predetermined number of code phases corresponding to a number of the additional data bits, except for the first additional data bit, and a code phase is selected from the predetermined number of code phases based on the phase selection value.

6. The apparatus of claim 5, wherein the predetermined number of code phases of the Kasami sequence is determined in conformity with a length of a maximum channel delay profile of the communication system.

7. The apparatus of claim 1, wherein the generated sequence is multiplied by a predetermined gain value, coupled with the processed broadcasting data, and transmitted through a Transmitter Identification (TxID) signal transmission area in a transmission frame.

8. The apparatus of claim 1, further comprising a modulator configured to modulate the broadcasting data coupled with the sequence by the adder according to a Vestigial Side-Band (VSB) modulation scheme and transmit the broadcasting data and the additional data through a transmission frame.

9. A method for transmitting data in a communication system, comprising:
 processing broadcasting data regarding various types of digital broadcasts to be provided to users and converting additional data bits of the broadcasting data into a parallel type;

generating a Kasami sequence using the converted parallel-type additional data bits;

coupling the processed broadcasting data with the generated Kasami sequence; and modulating the broadcasting data coupled with the Kasami sequence according to a VSB modulation scheme and transmitting the modulated broadcasting data through a transmission frame;

wherein in said generating a Kasami sequence using the converted parallel-type additional data bits, a code phase is selected from code phases of the Kasami sequence using the additional data bits, except for a first additional data bit.

10. The method of claim 9, wherein in said generating a Kasami sequence using the converted parallel-type additional data bits, polarity of the Kasami sequence is selected using the first additional data bit of the converted parallel-type additional data bits.

11. The method of claim 10, wherein said generating a Kasami sequence using the converted parallel-type additional data bits includes generating the Kasami sequence having adjusted polarity and an adjusted code phase in conformity with the selected polarity and the selected code phase.

12. The method of claim 9, wherein the Kasami sequence has a predetermined number of code phases corresponding to a number of the additional data bits, except for the first additional data bit, and the predetermined number corresponds to a length of a maximum channel delay profile of the communication system.

13. The method of claim 9, wherein the generated Kasami sequence is transmitted through a Transmitter Identification (TxID) signal transmission area in the transmission frame.

* * * * *